United States Patent [19]

Christensen et al.

[11] Patent Number: 5,799,405

[45] Date of Patent: Sep. 1, 1998

[54] VERTICAL ALIGNMENT TOOL FOR UNDERGROUND INSTALLATION

[75] Inventors: Jack V. Christensen; Erwin D. Kanne, both of Castle Rock, Colo.

[73] Assignee: C.M.F. Corporation, Denver, Colo.

[21] Appl. No.: 755,670

[22] Filed: Nov. 25, 1996

Related U.S. Application Data

[63] Continuation-in-part of Ser. No. 381,593, Jan. 31, 1995, Pat. No. 5,577,862.
[51] Int. Cl.$^6$ .................................................. G01C 15/10
[52] U.S. Cl. .............................. 33/392; 33/308; 33/645; 405/53; 405/303
[58] Field of Search ...................... 405/53, 55, 132, 405/133, 151, 232, 303; 33/392, 304, 308, 533, 645

[56] References Cited

U.S. PATENT DOCUMENTS

| | | | |
|---|---|---|---|
| 3,879,852 | 4/1975 | Bondi | 33/392 |
| 4,495,707 | 1/1985 | Rousey . | |
| 4,674,188 | 6/1987 | Fisher | 33/392 X |

*Primary Examiner*—Tamara L. Graysay
*Assistant Examiner*—Frederick L. Lagman
*Attorney, Agent, or Firm*—John O. Mingle

[57] ABSTRACT

An aligning tool, involving plumb bob usage, for a fully assembled underground elevator ram system is provided and makes it possible to align the elevator ram into a required vertical position. Further this allows the fully assembled elevator to be vertically installed at site in a hole which often is flooded by groundwater.

6 Claims, 4 Drawing Sheets

VERTICAL ALIGNMENT TOOL FOR UNDERGROUND INSTALLATION

PRIOR APPLICATION

This application is a continuation-in-part of U.S. patent application Ser. No. 08/381,593, filed Jan. 31, 1995 now U.S. Pat. No. 5,577,862, whose specification is hereby incorporated by reference.

BACKGROUND OF INVENTION

1. Field of Invention

The invention relates to a tool or device to align a fully assembled underground elevator ram to a proper vertical position at site installation.

2. Background

Hydraulic elevators have been employed for many decades and one of the most successful of its early uses was to provide lift for aircraft carriers between the flight deck and the aircraft storage and maintenance levels.

Because such elevators in commercial applications must extend upward several floors, the hydraulic ram cylinder is buried a similar distance underground creating many problems such as environmental concerns due to leaking fluid and installation in water filled holes. Another severe problem is getting the elevator ram aligned to a proper vertical position so that cylinder wear due to misalignment is avoided including breach of the cylinder wall with possible fluid leakage and much down time.

With the hydraulic ram system, such ram rides in a cylinder and is moved by hydraulic fluid pressure of up to design conditions of 650 psi; however, actual operating pressures more normally range up to about 450 psi. Any faulty alignment of the ram and its cylinder can result in sufficient friction over time resulting in the wearing through of the cylinder wall and likely fluid leakage. The repair of such a breached cylinder often results in pulling of the whole elevator assembly which is very expensive particularly if the roof of the building is breached to allow large crane access. Lost operating time due to such repair is additionally expensive.

Corrosion problems are a very big, and expensive, aspect of hydraulic elevators. With much ground water normally in contact with the hydraulic ram outer cylinder, electrolytic corrosion often weakens the cylinder wall which is compounded by frictional wear due to a poorly aligned ram. A further aspect is that these elevators are expected to last the life of the building, which is likely 50 or more years. Thus hydraulic fluid leakage in old elevators is common.

Hydraulic elevator rams are typically installed in one piece because of water flooding of the drilled hole, and this makes it difficult to align the elevator ram and its containment cylinder into a required near perfect vertical position. The subject invention solves this problem.

Previous attempts at solving problems of alignment with plumb bobs involve specialized responses but are not applicable to hydraulic ram elevator systems. Typical is U.S. Pat. No. 4,495,707, issued Jan. 29, 1985, by J. Rousey entitled "Bidirectional Plumb Bob Level." This patent discloses a special enlarged plumb bob design used within a casing in order to obtain response to angular orientation of said casing.

SUMMARY OF INVENTION

The objectives of the present invention include overcoming the above-mentioned deficiencies in the prior art and providing a potentially economically viable tool for on site alignment during installation of assembled hydraulic ram elevator systems.

DETAILED DESCRIPTION OF INVENTION

Figure 1:
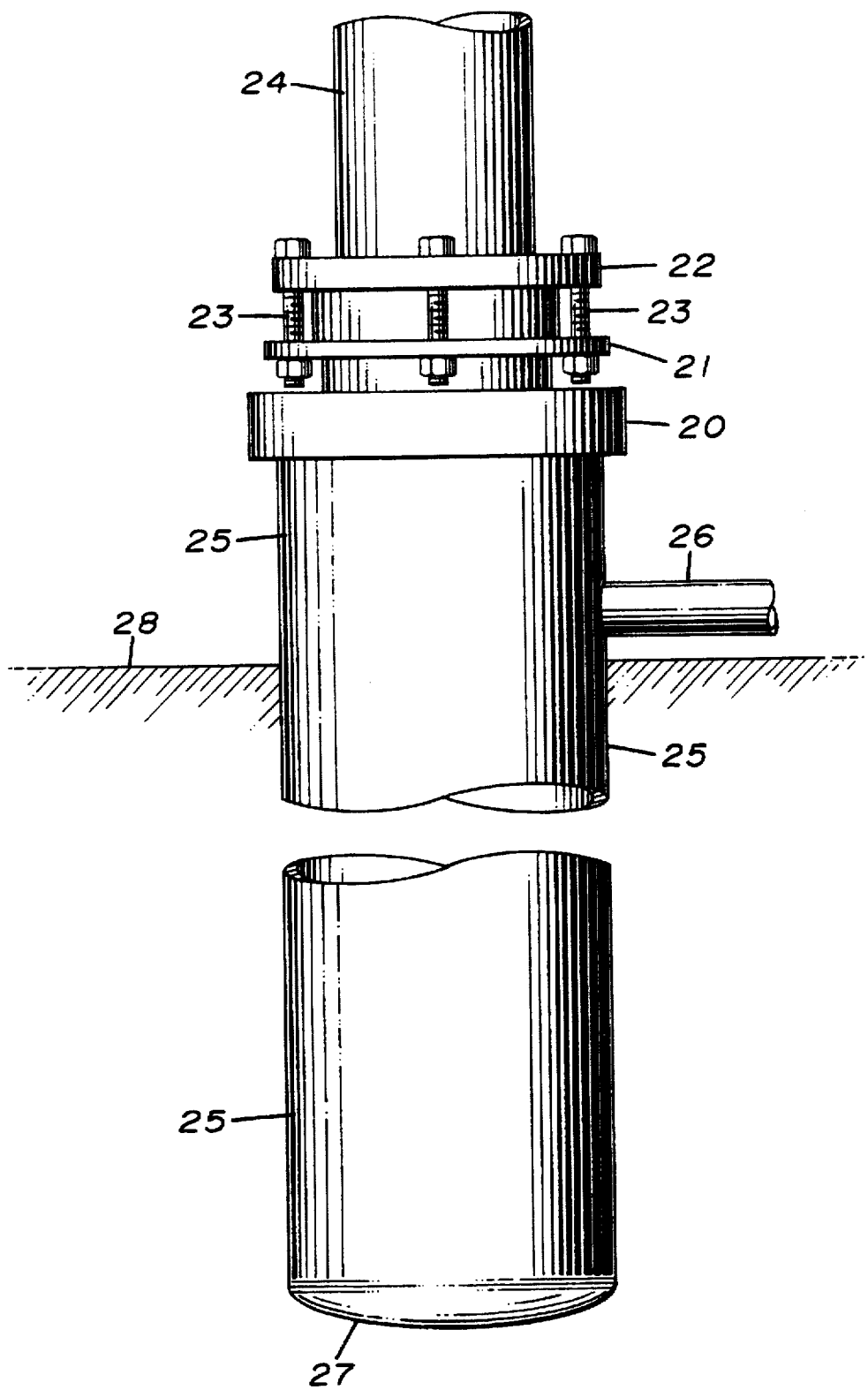
FIG. 1 shows a conventional assembled hydraulic ram system.

FIG. 1 shows the hydraulic cylinder without any containment and represents the common apparatus buried below ground, sometimes up to about 70 feet if the elevator must serve many floors. Here the main outside cylinder 25 which is often common material, such as schedule 40 black pipe, is exposed to the ground environment. The bottom of this cylinder is capped with a conventional pipe cap. The other parts shown in FIG. 1 represent conventional hydraulic ram system components. The pipe 26 leads to the hydraulic fluid reservoir. The main hydraulic ram 24 lifts the elevator which is sealed by a conventional stuffing gland containing a pressure ring 21 held tight by bolts 23 to a packing head 22 which fits inside the outer cylinder 25. This stuffing gland uses conventional packing material such as rubber and rigid plastic and is designed to hold the design hydraulic pressure of up to 650 psi. An excess oil ring 20 contains any leaking oil. The hat of the elevator system is considered to be components from the packing ring 22 on up. Loosening the packing head bolts 23 allows removal of this hat section, and this occurs during the installation stage of a hydraulic ram system by the subject vertical aligning tool.

Another aspect of the installation of a hydraulic ram system is to drill an oversize hole into the ground the proper distance, up to about 70 feet, to handle the height of the ram. This oversized hole is about twice the diameter of the main outside cylinder 25 in order to allow movement of the cylinder to bring it in line vertically. In addition the oversized hole allows better access for backfilling of the hole to firmly position the outside cylinder 25. The oversized hole also allows for the fact that due to underground difficulties such hole is often not drilled vertically itself.

Figure 2:
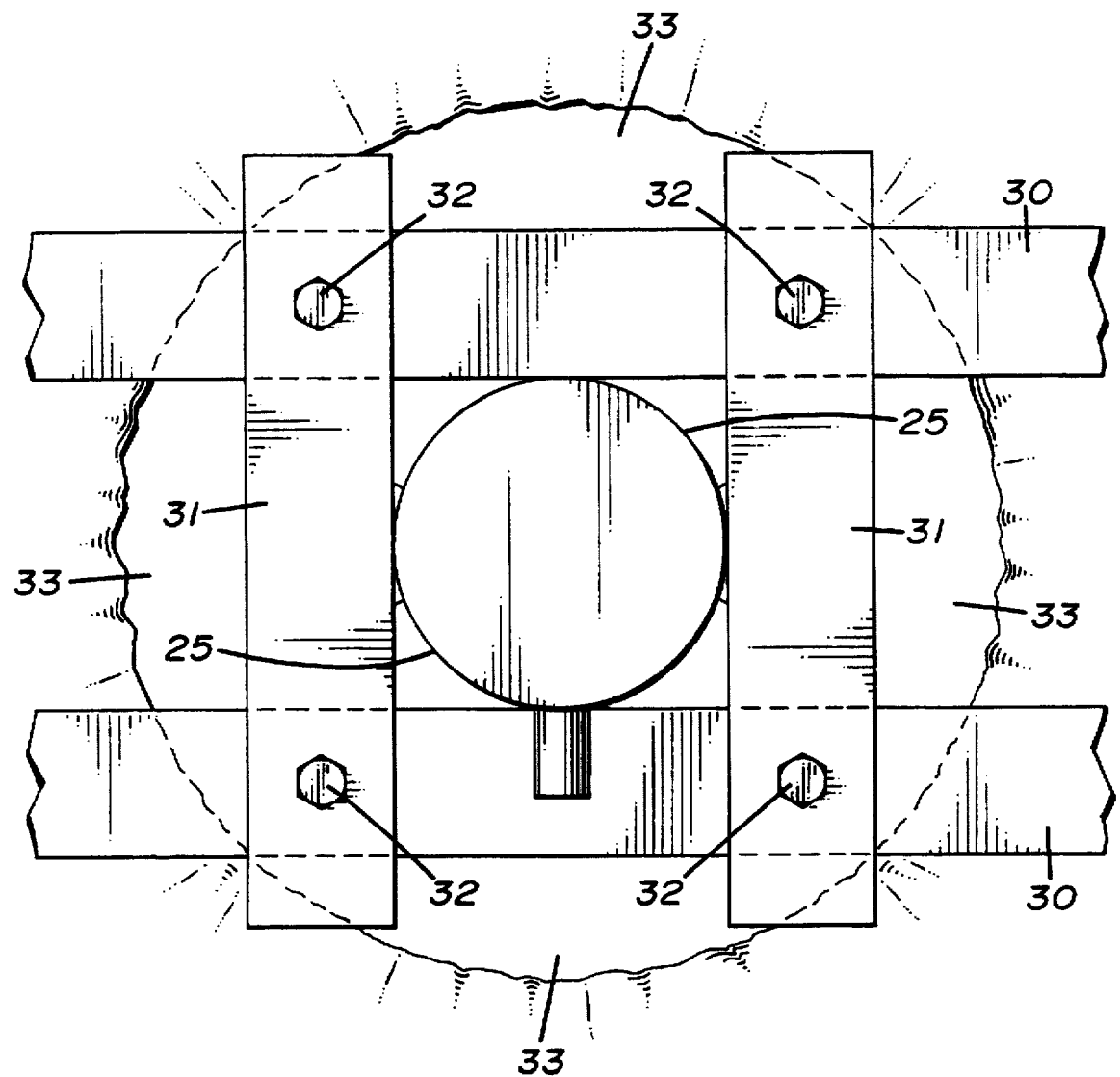
FIG. 2 shows the assembled hydraulic ram cylinder sitting on overlapping channels positioned over the drilled underground hole.

FIG. 2 shows the top of the oversized hole 33 with supporting channel 30, commonly called pit channels, positioned to support the main outside cylinder 25 which has welded channel 31, commonly called support ears, on it side. These ears are welded parallel to the pipe 26 leading to the hydraulic fluid reservoir and at about the same level. All channel is common structural material such as 8 inch for pit channels 30 and 4 inch for support ears 31 of conventional iron channel and must support the weight of the assembled ram is cylinder which runs up to about 4000 pounds for a large unit. Where the support ears 31 overlap the pit channels 30 four adjusting mechanisms 32 are positioned to allow small vertical adjustment and each is commonly a small bolt or set screw threaded through the support ears 31 and resting upon the pit channel 30. Thus by using a wrench these bolts or set screws 32 are adjusted to position the ram cylinder 25 vertically. Other means is potentially employable for this adjusting mechanism 32 such as using metal shims. This adjusting mechanism 32 is utilized to align the outside cylinder 25 before backfilling is started. Because backfilling is potentially disruptive, continual checking of vertical alignment during this procedure is required. It is the purpose of the subject invention to provide a good procedure to insure that the assembled ram cylinder 25 is always vertically installed.

Another difficulty encountered is that such a deep installation hole 33 often becomes flooded with water. The subject device keeps all the adjustment procedure above ground and so avoids such water problems.

Figure 3:
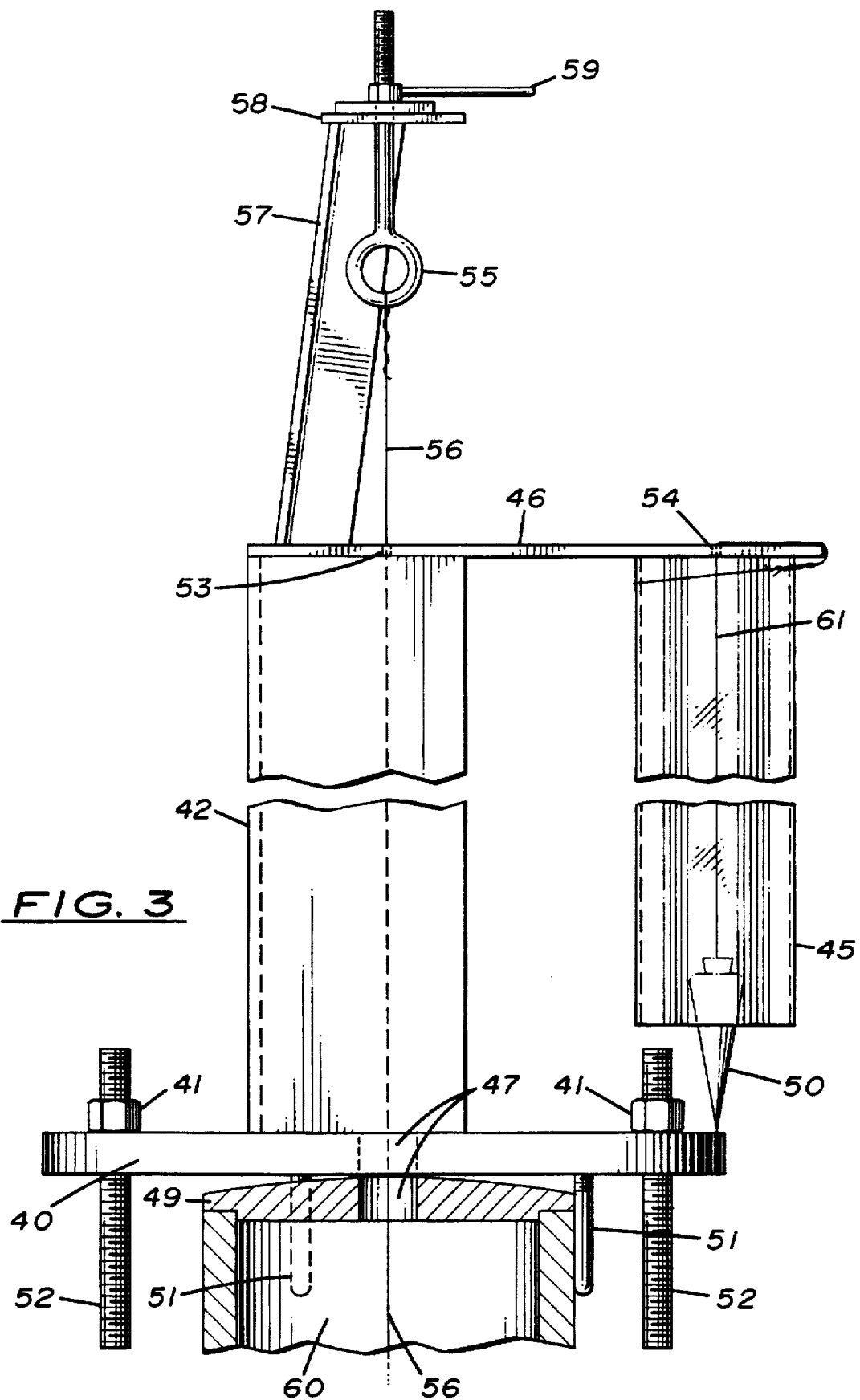
FIG. 3 shows the aligning tool mounted on the elevator ram cylinder.
Figure 4:
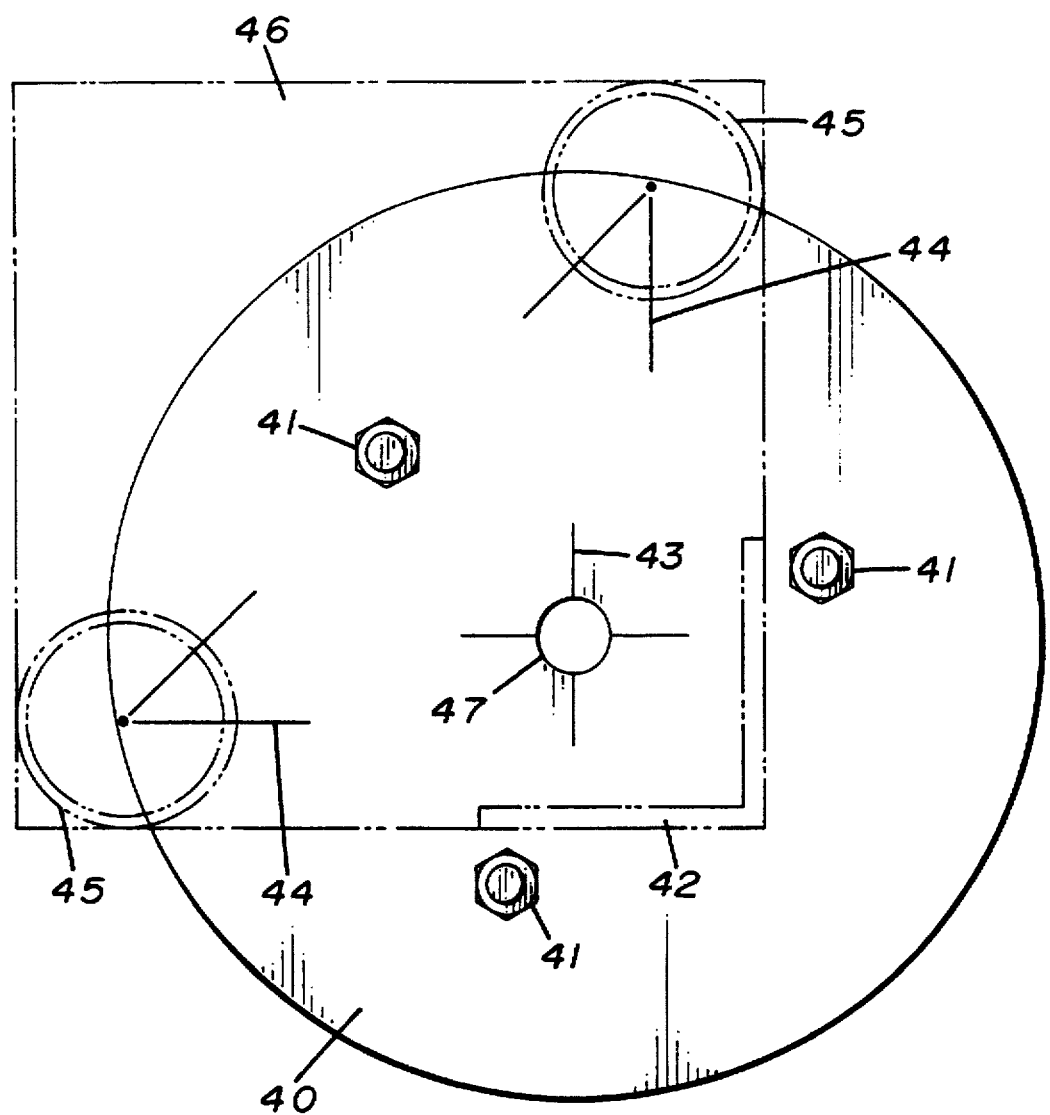
FIG. 4 shows the bottom plate of the alignment tool.

FIG. 3 shows the alignment tool attached to the top of the elevator ram cylinder 25 after removing the hat section from the cylinder which is the components from the packing ring 22 on up shown in FIG. 1. In FIG. 3 after the hat is removed a temporary crowned cap plate 49 is placed over the open cylinder top 60 which is centered by pins 51 extending from the bottom of plate 40 of the aligning tool and capturing the top of the piston 60. Such cap 49 is beveled or crowned slightly so that the bottom plate 40 is easily adjustable by proper selective tightening of the multiple long bolts 52. Both the bottom plate 40 and the cap plate 49 contain a centered hole 47 which passes a plumb wire 56 fastened in the bottom center of the cylinder 25 and running all the way to the top of the alignment tool where it fastens onto an eye bolt 55 which is part of an eye bolt mechanism 58 and allows said plumb wire 56 to be tightened to a taut position. The bottom plate 40 is captured and positioned tightly by the multiple long bolts 52, often three are sufficient, replacing the normal packing gland bolts 23 which have been removed when the hat section was taken off. The attaching nuts 41 are also indicated in FIG. 4. The top plate 46 is firmly attached to the bottom plate 40 by a welded piece of angle iron 42 and the actual edge position of this angle iron 42 to the top plate 46 is also shown in FIG. 4. The distance between the top plate 46 and the bottom plate 40 is a minimum twice the diameter of the outside of the ram cylinder 25 but for convenience is often fixed at about two feet.

A metal brace 57 firmly supports the eye bolt mechanism 58 on the upper side of the top plate 46 in such a position that the plumb wire 56 passes through a hole 53 in the top plate 46 which lies directly above the centered hole 47 in the bottom plate 40.

In FIG. 3 only one plumb bob 50 is shown although both plumb bob locations are shown in FIG. 4. Each plumb bob 50 is attached through a hole 54 in the top plate 46 positioned directly above the edge of the round bottom plate 40 again as shown in FIG. 4. To keep wind conditions from affecting the plumb bob 50 an oversize housing 45 consisting of a clear plastic cylinder is placed around the plumb bob line 61.

FIG. 4 shows the bottom plate 40 of the alignment tool. Its relation to the top plate 46 is shown by super-imposed dotted lines and is necessary to indicate why the appropriate scribe marks used for alignment lines are as indicated. This top plate 46 which is a rectangular piece of metal as indicated but can be other shapes is shown with a side view in FIG. 3. The round lower plate 40 is sized to have its clamping bolts and nuts 41 positioned to be in line with the bolt-holes in the packing head 21; however, in actual practice several sets of mounting holes are bored in said plate 40 to accommodate different sized ram cylinders 25. In FIG. 4 only one set of three plate support tightening nuts 41 are indicated. FIG. 3 shows the side view of such mounting bolts 52 and indicates that they represent replacing three of the bolts 23 normally holding the packing ring 22 in place. Long bolts 52 extend through the bottom plate 40 of the aligning tool. An angle iron 42 is welded onto said plate 40 extending vertically upwards and firmly supports an upper plate 46, shown dotted so as to only indicate its relative position with respect to said bottom plate, by welding onto a corner. At the center of the round bottom plate 40 a hole 47 is bored where the centering plumb wire 56 extending from the upper plate 46 passes through with considerable slack, and scribe marks 43 are placed on the lower plate 40 in order to more easily center said plumb wire 56 by appropriately adjusting the tightening nuts 41 on the multiple long bolts 52. This insures that the bottom plate 40 is correctly aligned with the ram cylinder 25 although not necessarily vertical at this junction in the alignment process.

Further scribe marks 44 for the two plumb bobs 50 are placed at the edge of the bottom plate 40 so that the position directly vertically below the hanging plumb bobs 50 is well indicated. These plumb bobs 50 are adjusted by the set screws 32, shown in FIG. 2, which move the total ram cylinder assembly including the attached alignment tool so that the tip of the plumb bobs 50 are sitting over the proper scribe marks 44 locations which are more than 90 degrees apart when viewed via the center of said bottom plate. Then vertical alignment is assured.

In FIG. 4 a housing 45 for the plumb bobs 50 consists of a clear plastic cylinder sufficiently larger than the plumb bobs 50 to not interfere with their operation and to keep environmental effects from disturbing the resulting alignment process. Other types of housing for the alignment tool are readily usable such as enclosing sheet metal over the total aligning tool. This housing is for environmental protection only and is not structure supporting as that is performed by the angle iron 42 which supports the upper plate 46 in a fixed position in relationship to the lower plate 40. The housing 45 just keeps the plumb bobs 50 from being affected by wind currents.

In theory only one plumb bob 50 is required to perform the alignment process; however, because this procedure is a field operation performed in all kinds of weather conditions and because the alignment tool must be moved from place to place under less than ideal conditions, it is desirable to utilize two plumb bobs 50 to detect miscalibration of the instrument. Proper alignment depends on support angle iron 42 being straight. By nature, most bends which occur in angle iron introduce some twist, and any extant twist is detected when both plumb bobs 50 cannot be simultaneously aligned with their respective scribed targets 44.

A tool for vertical alignment of an underground assembled elevator ram system with the hat section removed positioned over an oversized hole by load-supporting channel irons in an overlapping square pattern with adjustable set screws or bolts allowing a slight change in vertical alignment of said ram system comprising a first horizontal support plate containing a multiplicity of holes serving to support a plurality of plumb lines passing through said holes, and a second horizontal round support plate, attached off-center below said first plate by a structural member thereby a portion of said first plate extends beyond the edge of said second plate, containing a plurality of oversized symmetrical bolt holes to firmly bolt said second plate to the top outer edges of said elevator ram system, and further containing one centered hole for a plumb line, wherein said structural member positions said second plate parallel to said first plate with the distance between the two plates a minimum of two feet. An eye bolt mechanism firmly attaches on the upper side of said first plate by an appropriate supporting brace wherein said eye bolt is centered over a line hole in said first plate which is vertically above said centered hole for a plumb line in said second plate. A plumb line made of annealed wire attaches internally to the center bottom of the ram of said elevator system and running upwards through the central portion of said ram, passing through the centered hole on said second plate, continuing up through said line hole in said first plate, and finally attaching to said eye bolt mechanism, wherein adjusting of said second plate bolts allows centering of said plumb line through said centered hole of said second plate, and wherein said eye bolt mechanism insures a taut plumb line. A first plumb bob whose string attaches about one inch from the edge of said first plate which passes through a line hole in said first plate and extends vertically downward until said plumb bob intersects the edge of said second plate, and a second plumb bob whose string attaches about one inch from the edge of said first plate and passes through a line hole in said first plate and extends vertically downward until said plumb bob intersects the edge of said second plate, wherein said second plumb bob intersects said second plate about 90 degrees removed from said first plumb bob intersection, and wherein alignment of both plumb bobs is performed by adjusting said channel iron set screws. Finally a vertical isolation housing is attached to said first plate which serves to isolate said plumb bobs from environmental influence.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. A tool for vertical alignment of an underground system positioned over an oversized hole by load-supporting channel irons in an overlapping pattern with adjustable set screws allowing a slight change in vertical alignment of said system comprising:

a first horizontal support plate containing two plumb line holes;

a second horizontal round support plate, attached off-center below said first plate by a structural member thereby a portion of said first plate extends beyond the edge of said second plate, containing a plurality of symmetrical bolt holes to firmly bolt said second plate against the top edges of said system, and further containing one centered hole for a plumb line, wherein said structural member positions said second plate parallel to said first plate with the distance between the two plates a minimum of two feet; an eye bolt mechanism firmly attached on the upper side of said first plate by an appropriate supporting brace wherein said eye bolt is centered over a plumb line hole in said first plate which is vertically above said centered hole for a plumb line in said second plate;

a plumb line made of wire attached internally to the center bottom of the said system and running upwards through the central portion of said system, passing through the centered hole on said second plate, continuing up through said plumb line hole in said first plate, and attaching to said eye bolt mechanism, wherein adjusting of said second plate bolts allows centering of said plumb line through said centered hole of said second plate, and wherein adjusting said eye bolt mechanism insures a taut plumb line;

a plumb bob whose string attaches about one inch from the edge of said first plate passing through a line hole in said first plate and extending vertically downward until said plumb bob intersects the edge of said second plate, wherein alignment of said plumb bob is performed by adjusting said channel iron set screws; and a vertical isolation housing attached to said first plate serving to isolate said plumb bob from environmental influence.

2. A tool for vertical alignment of an underground assembled elevator ram system with the hat section removed positioned over an oversized hole by load-supporting channel irons in an overlapping square pattern with adjustable set screws allowing a slight change in vertical alignment of said ram system comprising:

a first horizontal support plate containing a multiplicity of holes serving to support a plurality of plumb lines passing through said holes;

a second horizontal round support plate, attached off-center below said first plate by a structural member thereby a portion of said first plate extends beyond the edge of said second plate, containing a plurality of oversized symmetrical bolt holes to firmly bolt said second plate against the top outer edges of said elevator ram system, and further containing one centered hole for a plumb line, wherein said structural member positions said second plate parallel to said first plate with the distance between the two plates a minimum of two feet;

an eye bolt mechanism firmly attached on the upper side of said first plate by an appropriate supporting brace wherein said eye bolt is centered over a line hole in said first plate which is vertically above said centered hole for a plumb line in said second plate;

a plumb line made of annealed wire attached internally to the center bottom of the ram of said elevator system and running upwards through the central portion of said ram, passing through the centered hole on said second plate, continuing up through said line hole in said first plate, and finally attaching to said eye bolt mechanism, wherein adjusting of said second plate bolts allows centering of said plumb line through said centered hole of said second plate, and wherein said eye bolt mechanism insures a taut plumb line;

a first plumb bob whose string attaches about one inch from the edge of said first plate passing through a line hole in said first plate and extending vertically downward until said plumb bob intersects the edge of said second plate;

a second plumb bob whose string attaches about one inch from the edge of said first plate passing through a line hole in said first plate and extending vertically downward until said plumb bob intersects the edge of said second plate, wherein said second plumb bob intersects said second plate about 90 degrees removed from said first plumb bob intersection, and wherein alignment of both plumb bobs is performed by adjusting said channel iron set screws; and a vertical isolation housing attached to said first plate serving to isolate said plumb bobs from environmental influence.

3. The tool according to claim 2 wherein said isolation housing further comprises clear plastic tubes separately surrounding each plumb bob.

4. The tool according to claim 2 wherein said plumb bobs further comprise scribe marks placed upon said second plate edges.

5. The tool according to claim 2 wherein said plumb line further comprises scribe marks placed around said second plate centered hole.

6. The tool according to claim 2 wherein said centering of said plumb line through said centered hole of said second plate further comprises installation of a ram cylinder beveled cap containing a centered hole replacing said hat section.

* * * * *